US012320406B2

(12) United States Patent
Ross

(10) Patent No.: US 12,320,406 B2
(45) Date of Patent: Jun. 3, 2025

(54) ATTACHMENT MECHANISM BETWEEN A BASE AND A BODY SECURED OR GRIPPED OBJECT

(71) Applicant: Exemplar Design, LLC, Mason, OH (US)

(72) Inventor: Adam L. Ross, Loveland, OH (US)

(73) Assignee: EXEMPLAR DESIGN, LLC, Mason, OH (US)

( * ) Notice: Subject to any disclaimer, the term of this patent is extended or adjusted under 35 U.S.C. 154(b) by 491 days.

(21) Appl. No.: 17/715,344

(22) Filed: Apr. 7, 2022

(65) Prior Publication Data

US 2022/0325778 A1 Oct. 13, 2022

Related U.S. Application Data

(60) Provisional application No. 63/172,380, filed on Apr. 8, 2021.

(51) Int. Cl.
*F16G 11/12* (2006.01)

(52) U.S. Cl.
CPC .................................... *F16G 11/12* (2013.01)

(58) Field of Classification Search
CPC ........ B63B 32/73; F16B 35/048; F16B 7/182; F16G 11/025; F16G 11/12; F16G 15/08; Y10T 24/3916; Y10T 24/44991; Y10T 24/4522; Y10T 24/47; Y10T 24/4745; Y10T 403/32163; Y10T 403/32181;
(Continued)

(56) References Cited

U.S. PATENT DOCUMENTS 537,862 A * 4/1895 Smith ..................... F16G 15/08
24/DIG. 31
770,898 A * 9/1904 Fenstermacher ....... F16G 11/00
384/615
2,010,853 A 8/1935 Dyer
(Continued)

FOREIGN PATENT DOCUMENTS

CN 210078699 U 2/2020

OTHER PUBLICATIONS

"En-Guard™"; https://americandrillbushing.com/products-services/hoist-ringslifting-points/en-quard/; ADB Hoist Rings Mfg.; accessed Jun. 23, 2022; 4 pages.

(Continued)

*Primary Examiner* — Jack W Lavinder
(74) *Attorney, Agent, or Firm* — BakerHostetler

(57) ABSTRACT

Disclosed herein attachment mechanisms and methods of using the same. The attachment mechanism includes a first connector, a second connector, and a coupling positioned between and coupled to each of the first and second connectors. The first connector is adapted to be mounted to a stable or unstable base. The second connector is adapted to be mounted to a body-secured or gripped object. The coupling is adapted for free 360° rotation relative to at least one of the first and second connectors without decoupling therefrom. A method of using an attachment mechanism includes mounting a coupling to a first connector and mounting the coupling to a second connector opposite the first connector. The coupling is adapted for free 360° rotation relative to at least one of the first and second connectors without decoupling therefrom.

12 Claims, 9 Drawing Sheets

(58) Field of Classification Search
CPC ..... Y10T 403/32213; Y10T 403/32983; F16D 3/10; F16D 3/50
USPC ......... 52/704, 705; 482/129; 403/62, 72, 77, 403/78, 164, 301, 306; 254/DIG. 14; 248/693; 24/115 R
See application file for complete search history.

(56) References Cited

U.S. PATENT DOCUMENTS

| | | | | | |
|---|---|---|---|---|---|
| 2,318,119 | A * | 5/1943 | Westhaver | F16G 15/08 59/95 |
| 2,466,243 | A * | 4/1949 | Johnson | A01K 91/03 59/95 |
| 2,723,430 | A * | 11/1955 | Paillard | A45C 11/38 81/58.3 |
| 4,899,499 | A * | 2/1990 | Hoekstra | E01F 13/028 52/146 |
| 5,749,812 | A | 5/1998 | Feciura et al. | |
| 6,349,985 | B1 | 2/2002 | Aston | |
| 6,443,514 | B1 | 9/2002 | Fuller | |
| 6,814,523 | B1 * | 11/2004 | Nilsson | F16G 11/08 403/312 |
| 8,136,208 | B2 | 3/2012 | Borth et al. | |
| 8,172,476 | B2 * | 5/2012 | Berney | F16B 45/00 403/164 |
| 8,756,955 | B2 | 6/2014 | Walchle et al. | |
| 9,381,391 | B1 | 7/2016 | Welty, II | |
| 9,427,613 | B2 | 8/2016 | Jordan et al. | |
| 10,315,061 | B2 | 6/2019 | Yu | |
| 2010/0207406 | A1 | 8/2010 | Thomeczek | |
| 2010/0266333 | A1 | 10/2010 | Oswald et al. | |
| 2012/0302406 | A1 | 11/2012 | Hinds et al. | |
| 2013/0165299 | A1 | 6/2013 | Hunt | |
| 2015/0119206 | A1 | 4/2015 | Newman | |
| 2017/0028241 | A1 | 2/2017 | Nurse et al. | |
| 2020/0094085 | A1 * | 3/2020 | Wilson | A62B 35/0075 |

OTHER PUBLICATIONS

"PLBW pewag winner profilift beta lifting point"; pewag Austria GmgH; Feb. 2019; 4 pages.
"Side Swivel Lifting Ring"; https://www.jergensinc.com/Side-Swivel-Lifting-Ring#horizontalTab2; Jergens Manufacturing Efficiency; © 2022; accessed Jun. 23, 2022; 3 pages.
"Jumprope Handle Bearing"; https://jumprope.com/education/guides-articles/jumprope-handle-bearing-spin-baby-spin/; JumpNrope Ltd.; © 2018; accessed Apr. 1, 2021; 3 pages.
"High Speed Jump Rope Adjustable Skipping Rope with Self-Locking Jump Rope with 2 Speed Rope Cables, Weighted, Smooth 360 Degree Spin, Silicone Grip for Crossfit Training, Home Gym, Workout"; Brand—Kareeme; https://www.amazon.in/Adjustable-Skipping-Self-Locking-Weighted-Silicone/dp/B083QZVLHN; Amazon.com; © 1996-2022; accessed Jun. 23, 2022; 2 pages.
"Aiyu Rope Skipping, 360-Degree Rotating Skipping Rope, Skipping Rope for Fitness Training, Exercise and More Aerobic Exercise"; Brand—aiyu; https://www.amazon.com/aiyu-Skipping-360-Degree-Rotating-Training/dp/B08BN52NV; Amazon.com; © 1996-2022; accessed Jun. 24, 2022; 2 pages.
"Asboto Jump Rope,Boxing Jump Rope for at-Home Workouts, Great for Double Unders Skipping Rope, Workout Gear for Men and Women with Free Carrying Case"; Brand—Asboto; https://www.amazon.com/Asboto-at-Home-Workouts-Skipping-Carrying/dp/B08MQLNCZJ; Amazon.com; © 1996-2022; accessed Jun. 24, 2022; 2 pages.
"5 Ball Bearing Swivels"; https://www.apkfunkyb.com/index.php?main_page=product_info&products_id=201566; accessed Mar. 30, 2021; one page.
"Tomshoo Speed Jump Rope, Aluminum Anti-Slip Handle Self-Locking Adjustable Skipping Rope 360 Degree Rotation Jumping Rope with 2 Speed Rope Cables for Gym, Crossfit, Fitness, Home Workout(Black)"; Brand—Tomshoo; https://www.amazon.com/TOMSHOO-Adjustable-Lightweight-Skipping-Training/dp/B074M511VQ/ref=cm_cr_amp_d_pdt_img_top?ie=UTF8; Amazon.com; © 1996-2022; accessed Jun. 24, 2022; 5 pages.
"Amyone High Speed Jump Rope—Self-Locking, Screw-Free Design—Weighted, 360 Degree Spin, Home Workout"; https://www.piexitb.top/index.php?main_page=product_info&products_id=472861; accessed Apr. 1, 2021; one page.
"Redcamp Stainless Steel 304 Heavy Duty Swing Hangers Kit, Set of 1/2, 1000Lb Capacity 360° Rotate Hammock Hanging Set, 4 Screws for Concrete Wooden Yoga Hammock Chair Swing Sets, Silver"; Brand—Redcamp; https://www.amazon.com/dp/B088SZP8YF/ref=sspa_dk_detail_5?psc=1&spLa=ZW5jcnlwdGVkUXVhbGlmaWVyPUEzVUs2Q0o3VTFZQ1kzJmVuY3J5cHRIZElkPUEwMDU1NjE2MTdKVDFTR1ITT0s1WCZlbmNyeXB0ZWRBZElkPUEwNDQ1MzA3MzBLNFdXV0JaNDcySyZ3aWRnZXROYW1lPXNwX2RldGFpbDlmYWN0aW9uPWNsaWNrUmVkaXJlY3QmZG9Ob3RMb2dDbGljaz10cnVl; Amazon.com; © 1996-2022; accessed Jun. 24, 2022; 5 pages.
"Hoist Rings"; https://www.te-co.com/pdf/hoistrings.pdf; Teco; accessed Jun. 24, 2022; p. 140-160.

* cited by examiner

ATTACHMENT MECHANISM BETWEEN A BASE AND A BODY SECURED OR GRIPPED OBJECT

CROSS-REFERENCE TO RELATED APPLICATION(S)

This application claims priority to U.S. Provisional Patent Application No. 63/172,380, filed Apr. 8, 2021, the content of which is hereby incorporate by reference in its entirety.

TECHNICAL FIELD

Described herein are attachment mechanisms and methods of using the same. More particularly, the attachment mechanisms of the present disclosure may be used between a stable or unstable base and a body-secured or gripped object.

BACKGROUND

The information included in this Background section of the specification, including any references cited herein and any description or discussion thereof, is included for technical reference purposes only and is not to be regarded subject matter by which the scope of the invention as defined in the claims is to be bound.

Conventionally, removable connection methods such as carabiners, buckles, or any other forms of detachable pieces have been used as connection methods for exercise cords, bands, handles, straps or other materials. However, such devices typically require difficult, clunky, time-consuming, and/or unsafe connection methods.

As a result, a need exists for a new attachment mechanism that overcomes at least some of the aforementioned drawbacks of conventional connection methods. Additionally, it would be advantageous to provide an attachment mechanism that permits free 360° rotation along one or more sides of the attachment mechanism. Further yet, it would be advantageous to provide an attachment mechanism that can be used in a variety of applications, across multiple industries, and with various products. Finally, it would be advantageous to provide an attachment mechanism that enables additional safety precautions, such as by preventing unintentional and/or undesirable decoupling.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

The present disclosure is generally related to attachment mechanisms and method of using the same, such as in connection with resistance tubing, jump ropes, suspension trainers, surfing leashes, bags, and the like. As described herein, the attachment mechanism may be used to replace removable connection methods such as carabiners, buckles, or any other forms of detachable pieces. Generally, the attachment mechanism includes a first connector (e.g., a female connector component) adapted to be mounted to a stable mount or base (e.g., wall, surfboard) or unstable mount or base (e.g., fabric, tube, bag), a second connector (e.g., a male connector component) adapted to be mounted (e.g., rotatably mounted) to a body-secured or gripped object (e.g., exercise cord, band, handle, strap), and a coupling positioned between and coupled to each of the first and second connectors and adapted for free 360° rotation relative to at least one of the first and second connectors without decoupling therefrom.

According to one aspect of the present disclosure, an attachment mechanism is provided. The attachment mechanism according to a first example includes a first connector, a second connector, and a coupling. The coupling is positioned between each of the first and second connectors. The coupling is coupled to each of the first and second connectors. The first connector is adapted to be mounted to a stable or unstable base. The second coupling is adapted to be mounted to a body-secured or gripped object. The coupling is adapted for free 360° rotation relative to at least one of the first and second connectors without decoupling therefrom.

In certain constructions, the coupling may be adapted for free 360° rotation relative to each of the first and second connectors without decoupling therefrom.

In examples, the second connector may be adapted to be rotatably mounted to the body-secured or gripped object.

According to particular examples, the base may be selected from the group consisting of a wall, a door, a surfboard, a rope, a ridden vehicle, and a bag. In the same or other examples, the object may be selected from the group consisting of an exercise cord, a band, a handle, and a strap.

The first connector may, in certain examples, include a female-threaded channel. The coupling may include a male-threaded shaft. The male-threaded shaft of the coupling may be adapted for threading into the female-threaded channel of the first connector. The female-threaded channel of the first connector may be threaded at an entrance thereto. The female-threaded channel of the first connector may further be unthreaded distal to the entrance thereof. The male-threaded shaft of the coupling may be threaded at a leading end thereof. The male-threaded shaft of the coupling may further be unthreaded distal to the leading end thereof. In examples, once the male-threaded shaft is completely threaded into the female-threaded channel, the threaded leading end of the male-threaded shaft may pass by the threaded entrance of the female-threaded channel such that the coupling is capable of free 360° rotation relative to the first connector.

In certain constructions, the coupling may include a shaft extending therefrom. The shaft extending from the coupling may define a concentrically-threaded hole therein. The second connector may include a leading cylinder. The leading cylinder may be adapted to slide over the shaft extending from the coupling. A trailing end of the leading cylinder may include an annular shoulder. The annular shoulder may be adapted to seat a fastener threaded into the concentrically-threaded hole of the shaft extending from the coupling. The annular shoulder and the fastener may be adapted to act as a bearing for rotation between the second connector and the coupling.

According to particular examples, one of the first connector, the second connector, and the coupling may include a female-threaded channel. Another of the first connector, the second connector, and the coupling may include a male-threaded shaft. The male-threaded shaft may be adapted for threading into the female-threaded channel. The female-threaded channel may be threaded at an entrance thereto. The female-threaded channel may further be unthreaded distal to the entrance thereof. The male-threaded shaft may be threaded at a leading end thereof. The male-threaded shaft may further be unthreaded distal to the leading end thereof. In examples, once the male-threaded shaft is completely threaded into the female-threaded channel, the threaded leading end of the male-threaded shaft may pass by the threaded entrance of the female-threaded channel such that the another of the first connector, the second connector, and the coupling is capable of free 360° rotation relative to the one of the first connector, the second connector, and the coupling.

According to one example, an attachment mechanism of the present disclosure includes a first connector, a second connector, and a coupling. The coupling is positioned between each of the first and second connectors. The coupling is coupled to each of the first and second connectors. The first connector is adapted to be mounted to a stable or unstable base. The second coupling is adapted to be mounted to a body-secured or gripped object. The coupling is adapted for free 360° rotation relative to at least one of the first and second connectors without decoupling therefrom.

According to another aspect of the present disclosure, a method of using an attachment mechanism is provided. The method according to a first example includes mounting a coupling to a first connector and mounting the coupling to a second connector. The coupling is mounted to the first connector opposite the second connector. The coupling is adapted for free 360° rotation relative to at least one of the first and second connectors without decoupling therefrom.

According to particular examples, mounting the coupling to the first connector may include threading a male-threaded shaft of the coupling into a female-threaded channel of the first connector. The method may further include completely threading the male-threaded shaft into the female-threaded channel with a threaded leading end of the male-threaded shaft passing by a threaded entrance of the female-threaded channel such that the coupling is capable of free 360° rotation relative to the first connector. The method may further include dismounting the coupling from the first connector by moving the coupling away from the first connector until the threaded leading end of the male-threaded shaft of the coupling engages the threaded entrance of the female-threaded channel of the first connector and subsequently unscrewing the male-threaded shaft of the coupling from the female-threaded channel of the first connector.

According to particular examples, mounting the coupling to the second connector may include sliding a leading cylinder of the second connector over a shaft extending from the coupling and threading a fastener into a concentrically-threaded hole of the shaft extending from the coupling. A trailing end of the leading cylinder of the second connector may include an annular shoulder adapted to seat the fastener. The annular shoulder and the fastener may act as a bearing for rotation between the second connector and the coupling.

BRIEF DESCRIPTION OF THE DRAWINGS

The foregoing and other features of the present disclosure will become more fully apparent from the following description, taken in conjunction with the accompanying drawings. These drawings depict only several exemplary embodiments in accordance with the disclosure and are, therefore, not to be considered limiting its scope. The disclosure will be described with additional specificity and detail through use of the accompanying drawings.

In the drawings.

DETAILED DESCRIPTION

Figure 1:
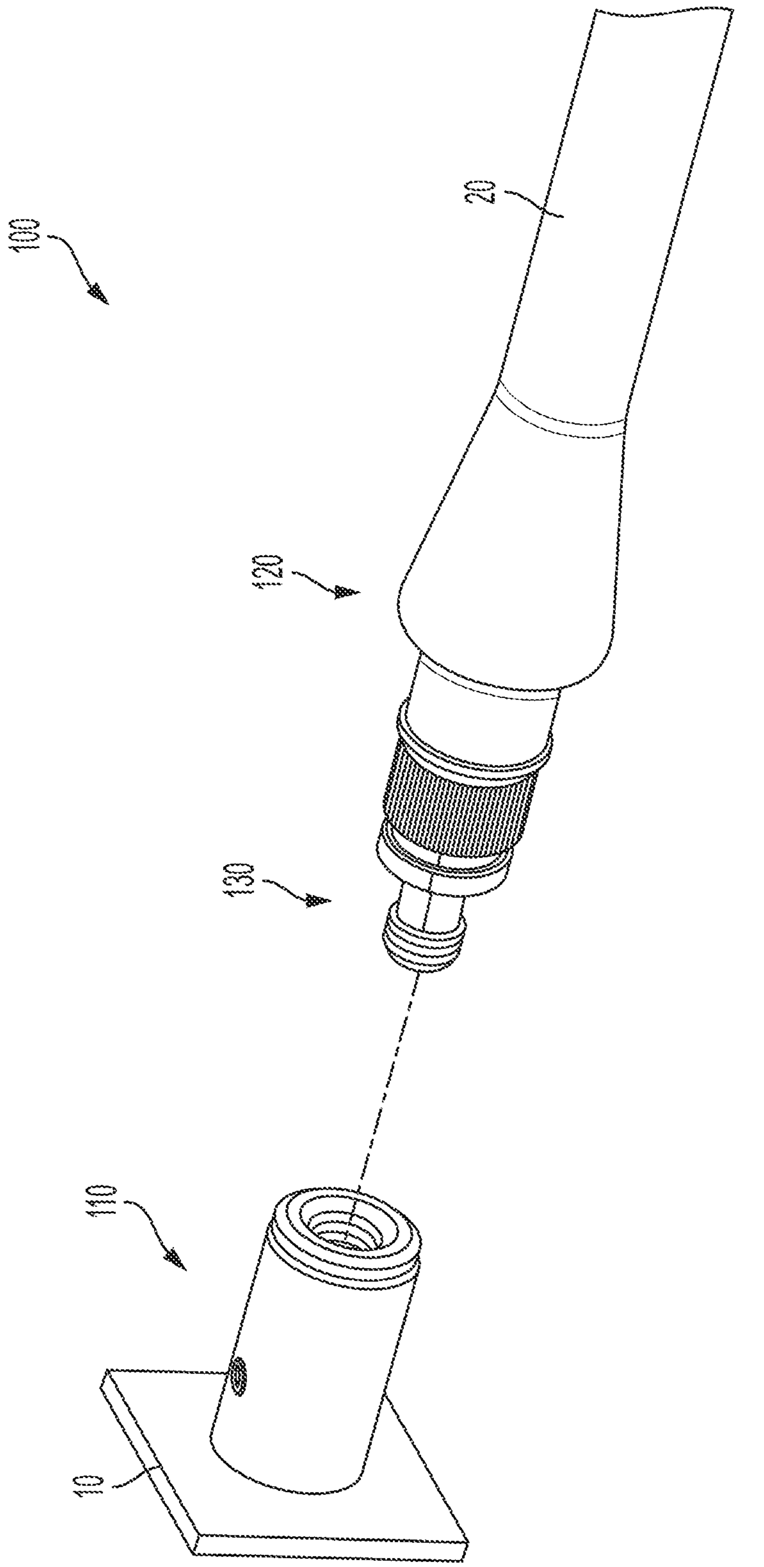
FIG. 1 is a perspective view of a system including one example of an attachment mechanism according to the present disclosure.
Figure 2:
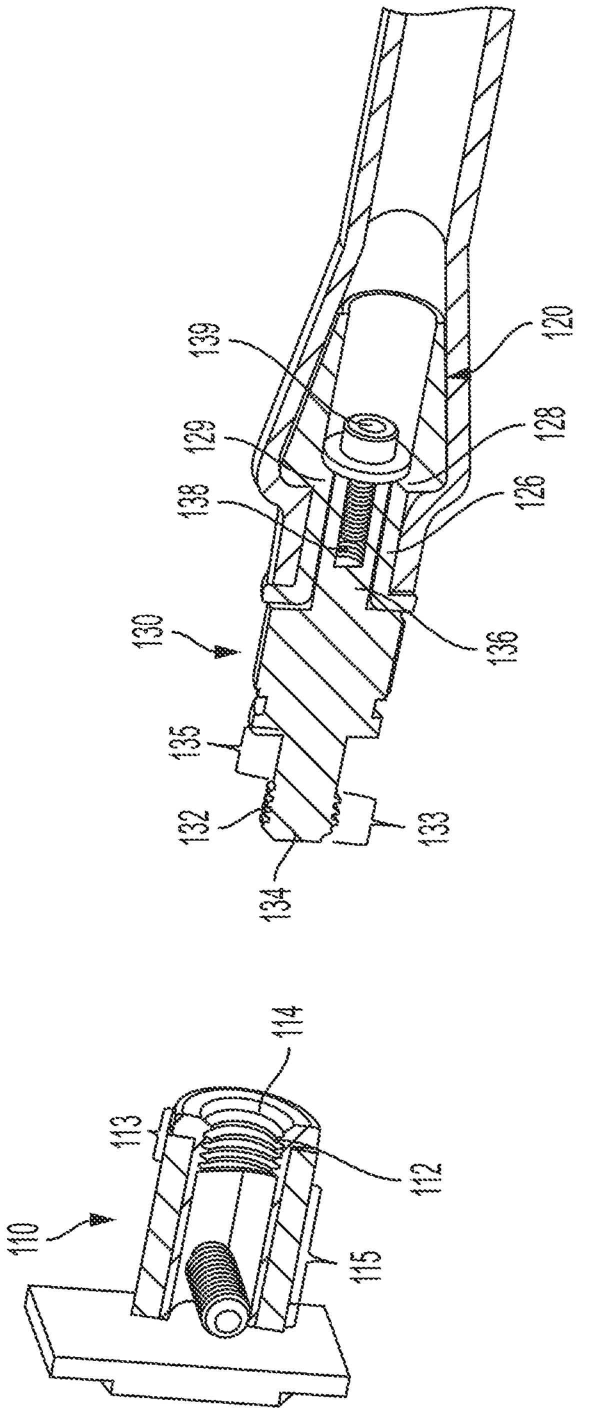
FIG. 2 is a perspective cross-sectional view of the system of FIG. 1.

The present disclosure may be understood more readily by reference to the following detailed description of desired embodiments and the examples included therein. In the following specification and the claims which follow, reference will be made to a number of terms which shall be defined to have the following meanings.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

The term "comprising" is used herein as requiring the presence of the named component and allowing the presence of other components. The term "comprising" should be construed to include the term "consisting of", which allows the presence of only the named component, along with any impurities that might result from the manufacture of the named component.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 inches to 10 inches" is inclusive of the endpoints, 2 inches and 10 inches, and all the intermediate values). The endpoints of the ranges and any values disclosed herein are not limited to the precise range or value; they are sufficiently imprecise to include values approximating these ranges and/or values.

The modifier “about” used in connection with a quantity is inclusive of the stated value and has the meaning dictated by the context (for example, it includes at least the degree of error associated with the measurement of the particular quantity). When used in the context of a range, the modifier “about” should also be considered as disclosing the range defined by the absolute values of the two endpoints. For example, the range of “from about 2 to about 10” also discloses the range “from 2 to 10.”

The terms “substantially” and “about” can be used to include any numerical value that can vary without changing the basic function of that value. When used with a range, “substantially” and “about” also disclose the range defined by the absolute values of the two endpoints, e.g. “about 2 to about 4” also discloses the range “from 2 to 4.” The terms “substantially” and “about” may refer to plus or minus 10% of the indicated number.

The present disclosure may refer to components as having a length, width, height, and thickness. It is noted that “length” and “width” are used interchangeably herein, or put another way, these terms refer to the same dimension or axis.

It should be noted that many of the terms used herein are relative terms. For example, the terms “upper” and “lower” are relative to each other in location, i.e. an upper component is located at a higher elevation than a lower component in a given orientation, but these terms can change if the device is flipped. The terms “horizontal” and “vertical” are used to indicate direction relative to an absolute reference, i.e. ground level. The terms “above” and “below”, or “upwards” and “downwards” are also relative to an absolute reference; an upwards flow is always against the gravity of the earth.

The term “parallel” should be construed in its lay term as two edges or faces generally continuously having the same distance between them, and should not be strictly construed in mathematical terms as requiring that the two edges or faces cannot intersect when extended for an infinite distance. Similarly, the term “planar” should not be strictly construed as requiring that a given surface be perfectly flat.

Figure 3:
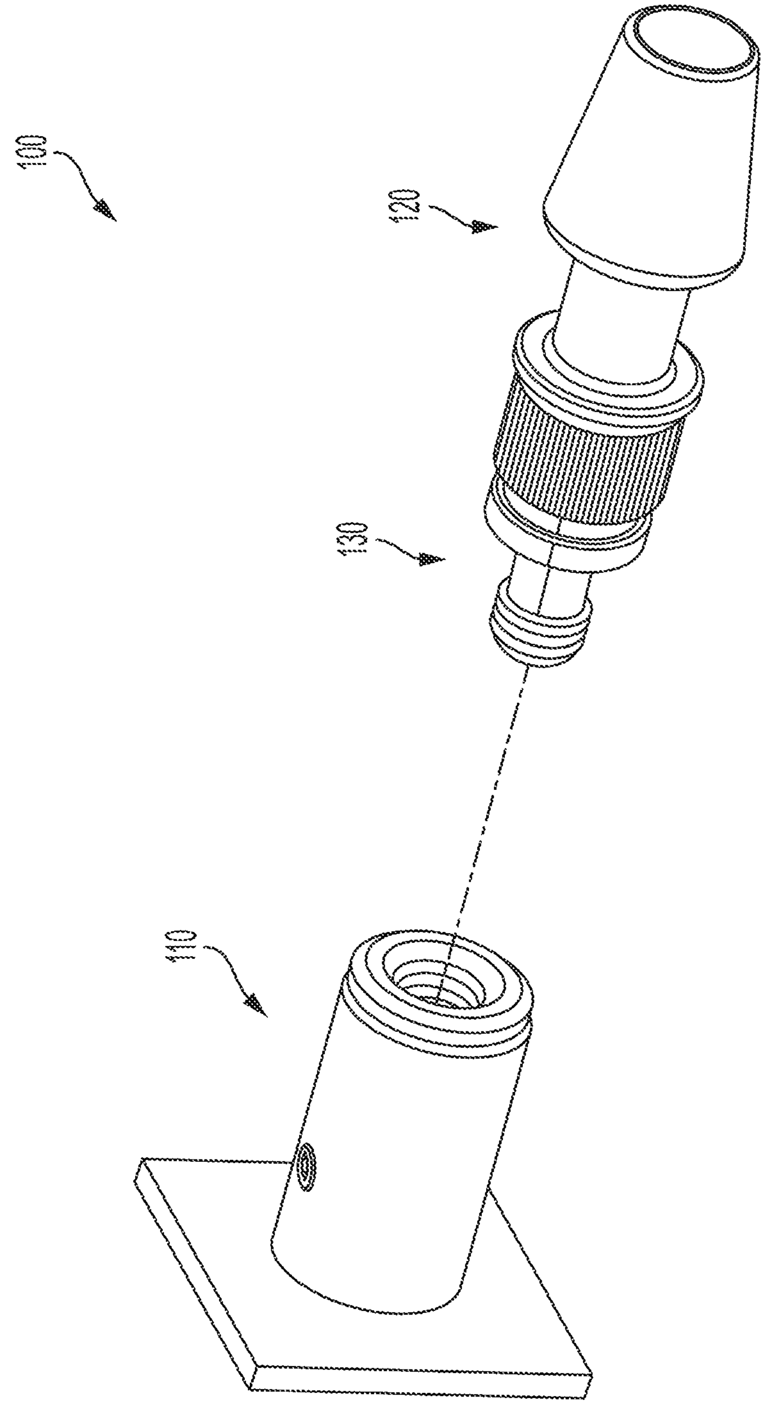
FIG. 3 is a perspective view of one example of an attachment mechanism according to the present disclosure.
Figure 4:
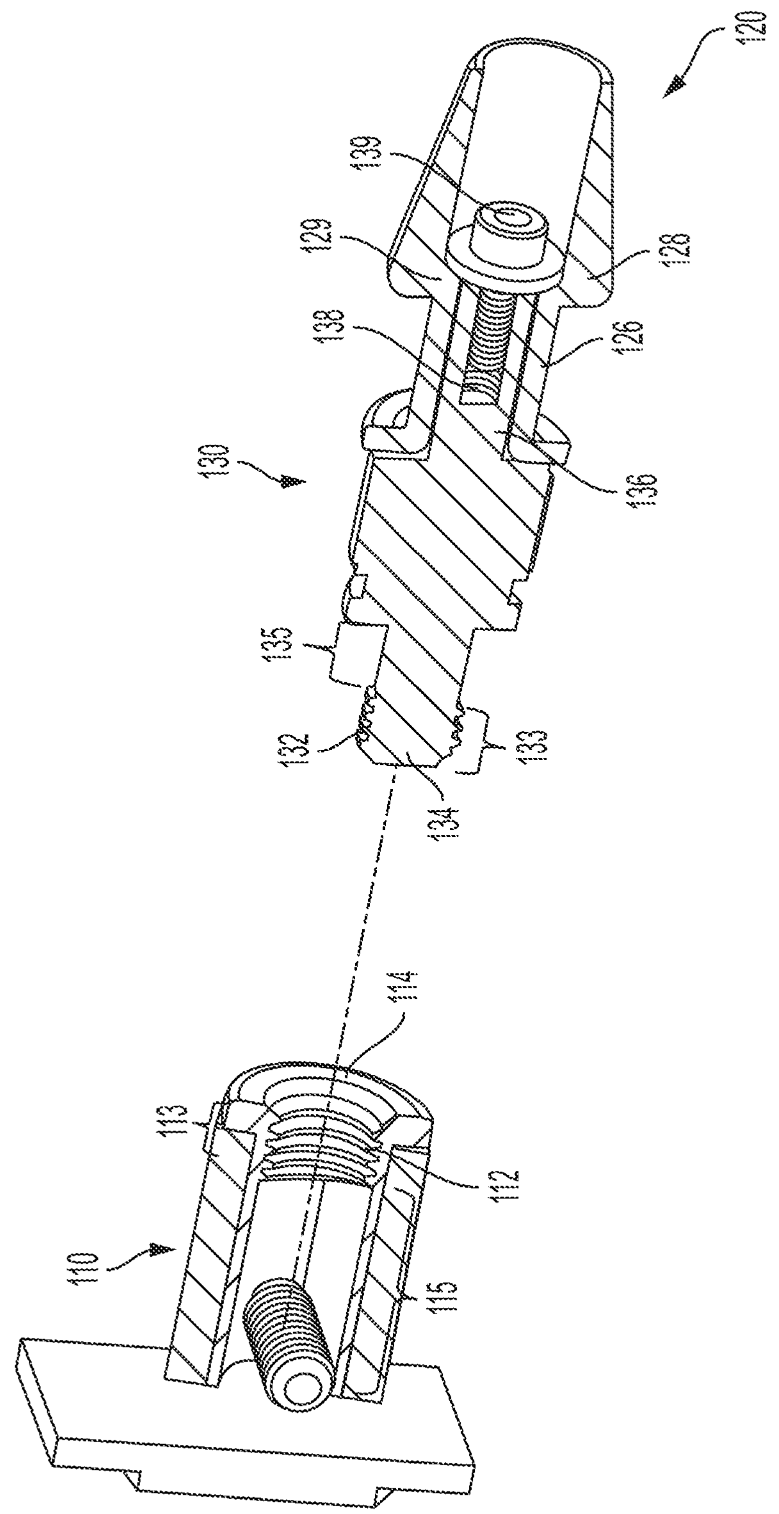
FIG. 4 is a perspective cross-sectional view of the attachment mechanism of FIG. 3.
Figure 5:
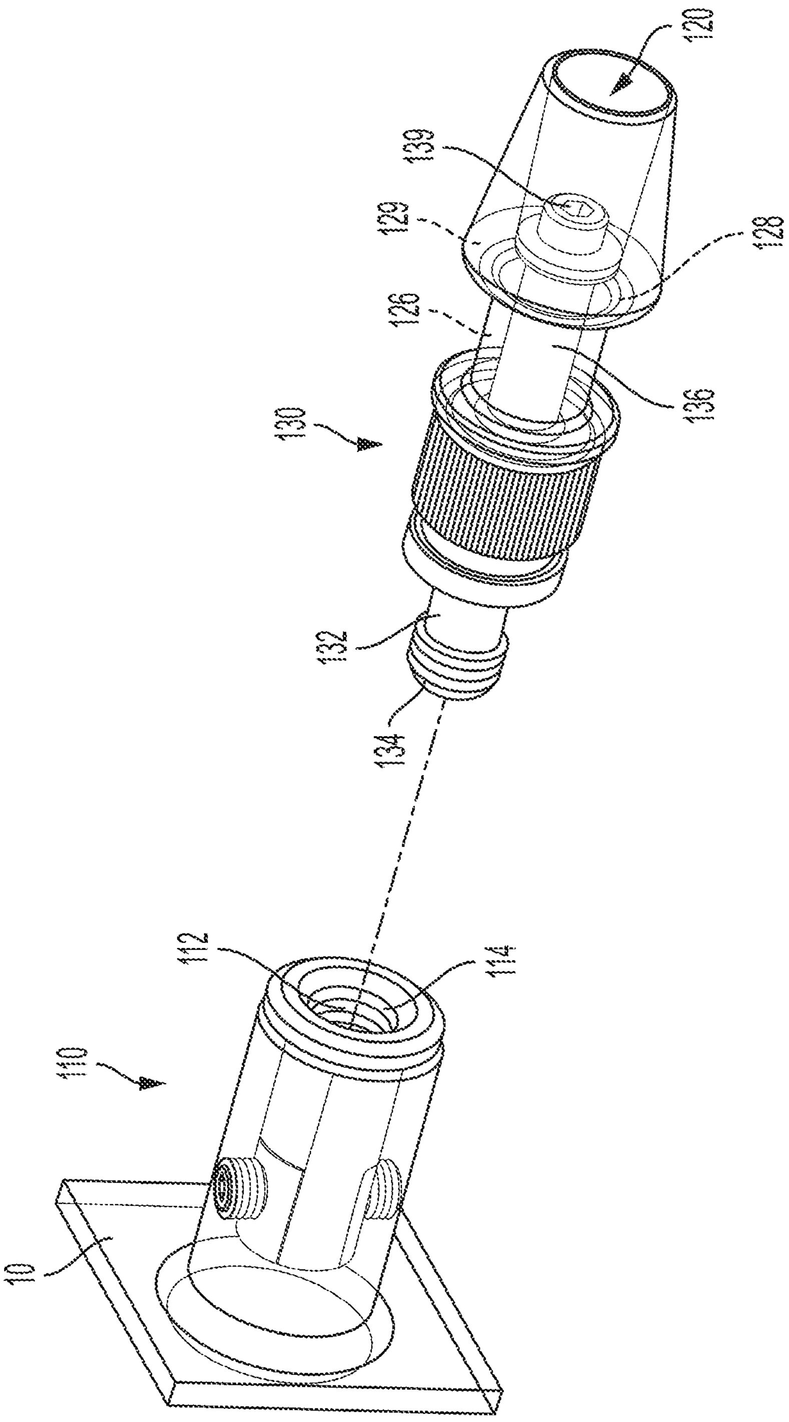
FIG. 5 is a perspective view of the attachment mechanism of FIG. 3 with certain portion shown as partially transparent to illustrate additional features.
Figure 6:
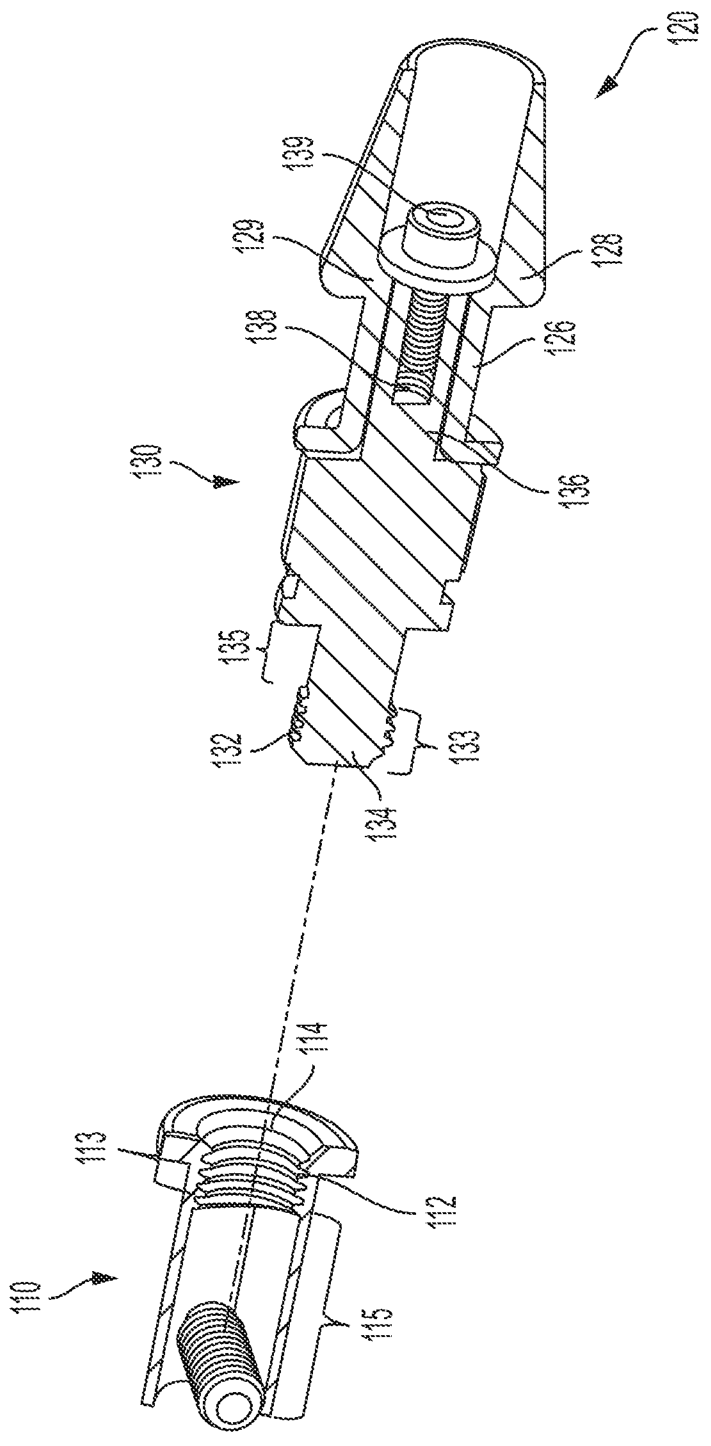
FIG. 6 is another perspective cross-sectional view of the attachment mechanism of FIG. 3.
Figure 7:
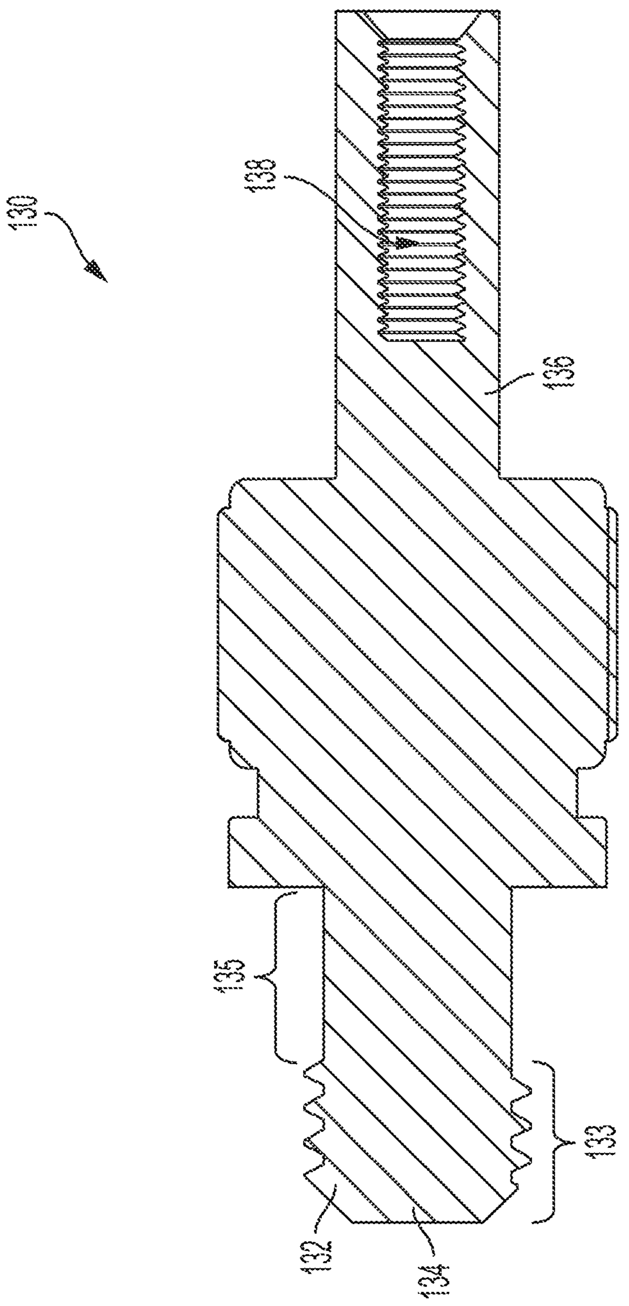
FIG. 7 is a side cross-sectional view of one example of a coupling of an attachment mechanism according to the present disclosure.
Figure 8:
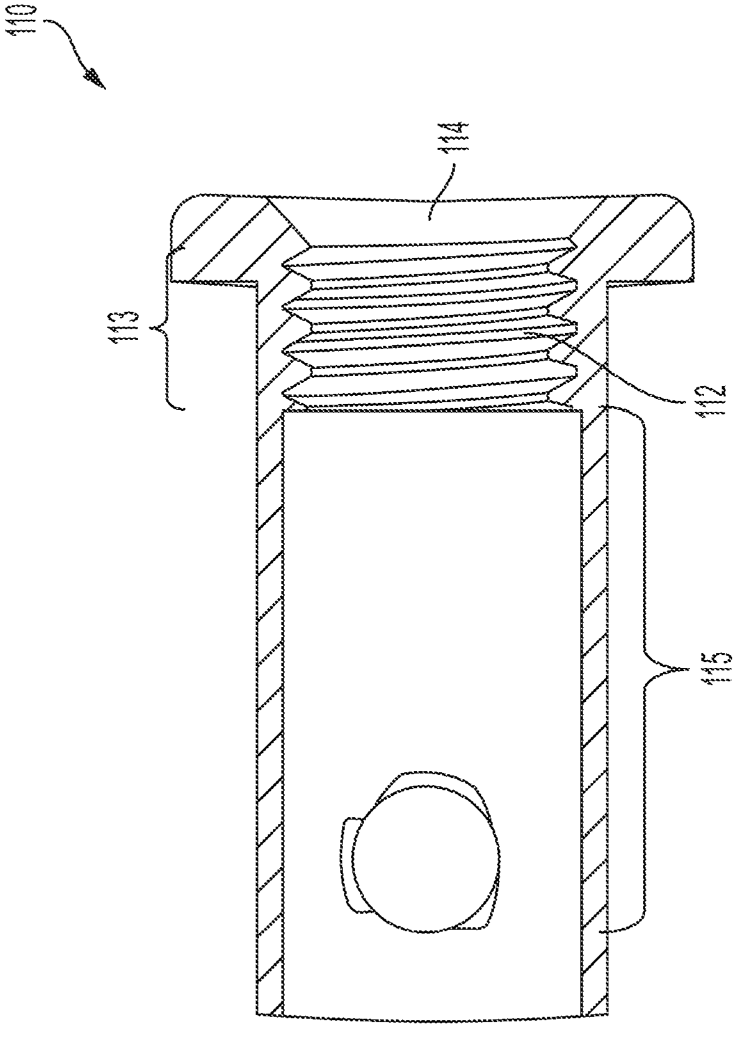
FIG. 8 is a side cross-sectional view of one example of a connector of an attachment mechanism according to the present disclosure.

With reference now to FIG. 1 and FIG. 3, an attachment mechanism 100 according to the present disclosure is depicted in use in a system including a base 10 and an object 20. In this example, the attachment mechanism 100 is generally illustrated as providing attachment between a stable base 10 and a gripped object 20, although other examples are not so limited. As will be appreciated by those skilled in the art, the attachment mechanisms 100 of the present disclosure can be used in a variety of applications, across multiple industries, and with various products. By way of non-limiting the attachment mechanisms 100 of the present disclosure may be used to replace carabiners, buckles, or any other forms of detachable pieces conventionally used as connection mechanisms. By way of further non-limiting example, the attachment mechanisms 100 of the present disclosure may be used to attach (e.g., interconnect) one object with another, such as by attaching a stable or unstable base (e.g., a wall, a door, a surfboard, a rope, a ridden vehicle, a bag) to a body-secured or gripped object (e.g., an exercise cord, a band, a handle, a strap), although other examples are not so limited.

With continued reference to FIG. 1 and FIG. 3, the attachment mechanism 100 generally includes a first connector 110, a second connector 120, and a coupling 130.

The first connector 110 is generally adapted to be mounted to a first object, such as a stable or unstable base 10. The first connector 110 may be mounted to the stable or unstable base 10 by any known removable or permanent mounting methods. By way of non-limiting example, the first connector 110 may be mounted to the stable or unstable base 10 by being fastened or welded thereto. The base 10 may be fixed to another object, or not.

The second connector 120 is generally adapted to be mounted to a second object, such as a body-secured or gripped object 20. The second connector 120 may be mounted to the body-secured or gripped object 20 by any known removable or permanent mounting methods. By way of non-limiting example, the second connector 120 may be mounted to the body-secured or gripped object 20 by friction fitting the body-secured or gripped object 20 over the second connector 120. In certain constructions, the second connector 120 may be rotatably mounted to the body-secured or gripped object 20, although other examples are not so limited. The object 20 may be fixed to another object, or not.

The coupling 130 is generally positioned between the first and second connector 110, 120. The coupling 130 is coupled to each of the first and second connector 110, 120. Put another way, the coupling 130 may be coupled to the first connector 110 opposite the second connector 120. The coupling 130 is adapted for free 360° rotation relative to at least one of the first and second connectors 110, 120 without decoupling therefrom. In particular constructions as described herein, the coupling 130 may be adapted for free 360° rotation relative to each of the first and second connectors 110, 120 without decoupling therefrom, although other examples are not so limited.

With reference now to FIG. 2, FIG. 4, FIG. 6, FIG. 8, and FIG. 9, the first connector 110 may, in certain examples, define a threaded portion 113. In the example illustrated in the drawings, the threaded portion 113 is a female-threaded channel 112, although other examples are not so limited. A threaded portion of the channel 112 of the first connector 110 may be positioned adjacent an entrance 114 thereof. In certain examples, the first connector 110 may further define a non-threaded portion 115. In the example illustrated in the drawings, the non-threaded-portion 115 may be positioned distal to the entrance 114. Put another way, the channel 112 of the first connector 110 may be threaded at the entrance 114 thereto and may be non-threaded distal to the entrance 114. The first connector 110, including the threaded portion 113 and unthreaded portion 115 thereof may be sized and shaped to suit a particular application. By way of non-limiting example, the female-threaded channel 112 of the first connector 110 may be sized and shaped to receive an 8 mm male-threaded portion of another object in threaded engagement therewith. In examples, the entrance 114 to the female-threaded channel 112 of the first connector 110 may define a counterbore, although other examples are not so limited.

With reference now to FIG. 2, FIG. 4, FIG. 6, FIG. 7, and FIG. 9, the coupling 130 may, in certain examples, define a threaded portion 133. In the example illustrated in the drawings, the threaded portion 133 is a male-threaded shaft 132, although other examples are not so limited. As may be understood with specific reference to FIG. 9, the male-threaded shaft 132 of the coupling 130 may be adapted for threading into the female-threaded channel 112 of the first connector 110. A threaded portion of the shaft 132 of the coupling 130 may be positioned adjacent a leading end 134 thereof. In certain examples, the coupling 130 may further define a non-threaded portion 135. In the example illustrated in the drawings, the non-threaded-portion 135 may be positioned distal to the leading end 134. Put another way, the shaft 132 of the coupling 130 may be threaded at the leading end 134 thereof and may be non-threaded distal to the leading end 134. The coupling 130, including the threaded portion 133 and unthreaded portion 135 thereof may be sized and shaped to suit a particular application. By way of non-limiting example, the male-threaded shaft 132 of the coupling 110 may be sized and shaped to be received within an 8 mm female-threaded portion of another object in threaded engagement therewith.

Figure 9:
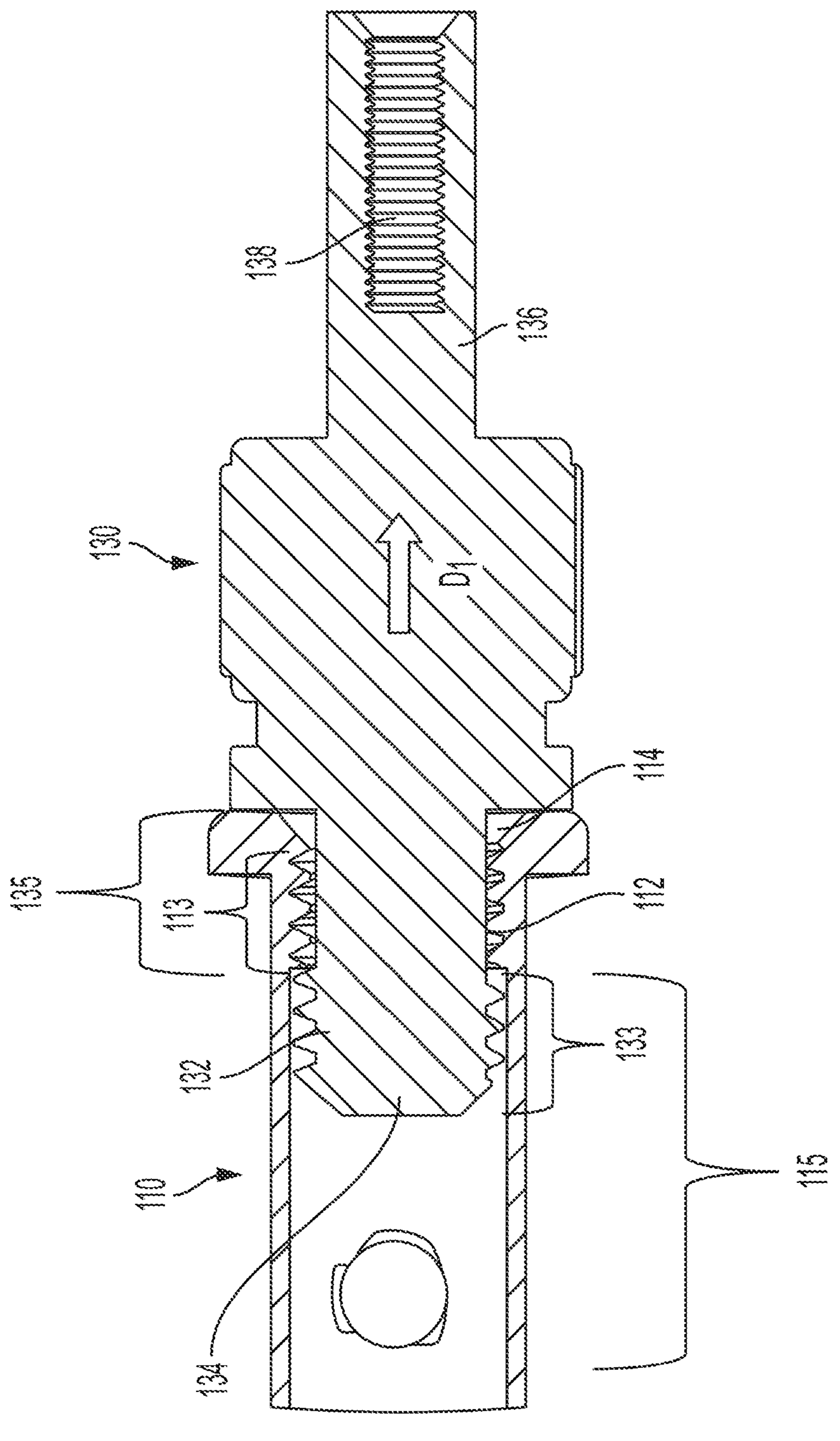
FIG. 9 is a side cross-sectional view of the coupling of FIG. 7 and the connector of FIG. 8, with a male-threaded shaft of the coupling completely threaded into a female-threaded channel of the connector.

As may be further understood with continued reference specifically to FIG. 9, the coupling 130 may be mounted to the first connector 110 by threading the threaded shaft 132 of the coupling 130 into the threaded channel 112 of the first connector 110 through the entrance 114 thereof in a direction opposite to direction Di. In examples, once the male-threaded shaft 132 of the coupling 130 is completely threaded into the female-threaded channel 112 of the first connector 110, the threaded leading end 134 of the male-threaded shaft 132 may generally pass by the threaded entrance 114 of the female-threaded channel 112. Put another way, the coupling 130 and first connector 110 may be in threaded engagement with one another until the threaded shaft 132 of the coupling 130 is subsequently received within the non-threaded portion 115 of the first connector 110. In this way, the coupling 130 is generally capable of free 360° rotation relative to the first connector 110 without unintentional and/or undesirable decoupling therefrom.

Conversely, to dismount the coupling 130 from the first connector 110, the coupling may first be moved away from the first connector 110 (e.g., by applying a pulling force to the coupling 130 along the direction Di) until the until the threaded leading end 134 of the male-threaded shaft 132 of the coupling 130 engages the threaded entrance 114 of the female-threaded channel 112 of the first connector 110. Subsequently, the male-threaded shaft 132 of the coupling 130 from the female-threaded channel 112 of the first connector 110 through the entrance 114 thereof in the direction Di. Requiring the coupling 130 to first be moved away from the first connector 110 and then subsequently unthreaded therefrom to dismount the coupling 130 from the first connector 110 may advantageously provide an additional safety precaution, such as by preventing unintentional and/or undesirable decoupling as between the coupling 130 and the first connector 110.

With reference back to FIG. 2, FIGS. 4-7, and FIG. 9, the coupling 130 may, in certain examples, include another shaft 136 extending outwardly therefrom. The shaft 136 may generally define a threaded hole. In the example illustrated in the drawings, the threaded hole is a concentrically-threaded hole 138, although other examples are not so limited. As previously described, the coupling 130, including the shaft 136 and the concentrically-threaded hole 138 defined therein may be sized and shaped to suit a particular application. By way of non-limiting example, the concentrically-threaded hole 138 defined in the shaft 136 of the coupling 130 may be sized and shaped to receive a fastener in threaded engagement therewith. In examples, an entrance to the concentrically-threaded hole 138 defined in the shaft 136 of the coupling 130 may define a counterbore, although other examples are not so limited.

With reference back to FIG. 2 and FIGS. 4-6, the second connector 120 may, in certain examples, include a leading cylinder 126. As may be understood with reference to FIG. 2 and FIGS. 4-6, the leading cylinder 126 of the second connector 120 may be adapted to slide over the shaft 136 extending from the coupling 130. In certain examples, a trailing end 128 of the leading cylinder 126 of the second connector 120 may include an annular shoulder 129. The annular shoulder 129 may be adapted to seat a fastener 139 (e.g., including a washer) thereagainst. As may be further understood with continued reference to FIG. 2 and FIGS. 4-6, the coupling 130 may be mounted to the second connector 120 by sliding the leading cylinder 126 of the second connector 120 over the shaft 136 extending from the coupling 130 and threading the fastener 129 into the concentrically-threaded hole 138 of the shaft 136 extending from the coupling 130. In examples, once the fastener 139 is threaded into the concentrically-threaded hole 138 of the shaft 136 extending from the coupling 130, the fastener 139 (e.g., a head or a washer thereof) may be seated against the annular shoulder 129 of the second connector 120. The annular shoulder 129 and the fastener 139 may be adapted to act (e.g., collectively) as a bearing for rotation between the coupling 130 and the second connector 120. Put another way, the second connector 120 may be mounted to the coupling 130 by the fastener 139, with the leading cylinder 126 of the second connector 120 disposed about the shaft 136 extending from the coupling 130. In this way, the coupling 130 is generally capable of free 360° rotation relative to the second connector 120 without unintentional and/or undesirable decoupling therefrom. The second connector 120, including the leading cylinder 126, the trailing end 128, and the annular shoulder 129 thereof may be sized and shaped to suit a particular application. By way of non-limiting example, the leading cylinder 126 is generally sized and shaped so as to be slidably disposed about the shaft 136 extending from the coupling 130.

As will be appreciated by those skilled in the art, while the first connector 110, the second connector 120, and the coupling 130 are generally illustrated and therefore described as having specific structures that cooperate with one another in specific arrangements, these specifics could be modified or reversed as desired to suit a particular application. By way of non-limiting example, the specifics of the threaded engagement between the first connector 110 and the coupling 130 could be reversed, as desired (e.g., the coupling 130 could alternatively be formed with a female-threaded channel and the first connector 110 could alternatively be formed with a male-threaded shaft).

In certain examples, one (or more) of the first connector 110, the second connector 120, and the coupling 130 may include a female-threaded channel. In such examples, another of the first connector 110, the second connector 120, and the coupling 130 may include a male-threaded shaft adapted for threading into the female-threaded channel. As described herein, the female-threaded channel may be threaded at an entrance thereto and may be unthreaded distal to the entrance. Similarly, as described herein, the male-threaded shaft may be threaded at a leading end thereof and unthreaded distal to the leading end. In such examples, once the male-threaded shaft is completely threaded into the female-threaded channel, the threaded leading end of the male-threaded shaft may pass by the threaded entrance of the female-threaded channel such that the another of the first connector 110, the second connector 120, and the coupling 130 (i.e., the one including the male-threaded shaft) is capable of free 360° rotation relative to the one of the first connector 110, the second connector 120, and the coupling 130 (i.e., the one including the female-threaded channel).

The above specification, examples and data provide a description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An attachment mechanism comprising:
- a first connector adapted to be mounted to a stable or unstable base;
- a second connector adapted to be mounted to a body-secured or gripped object; and
- a coupling positioned between and coupled to each of the first and second connectors, the coupling adapted for free 360° rotation relative to at least one of the first and second connectors without decoupling therefrom;
- wherein the first connector includes a female-threaded channel and the coupling includes a male-threaded shaft adapted for threading into the female-threaded channel;
- wherein the female-threaded channel is threaded at an entrance thereto and is unthreaded distal to the entrance; and
- wherein the male-threaded shaft is threaded at a leading end thereof and is unthreaded distal to the leading end.

2. The attachment mechanism of claim 1, wherein once the male-threaded shaft is completely threaded into the female-threaded channel, the threaded leading end of the male-threaded shaft passes by the threaded entrance of the female-threaded channel such that the coupling is capable of free 360° rotation relative to the first connector.

3. An attachment mechanism comprising:
- a first connector adapted to be mounted to a stable or unstable base;
- a second connector adapted to be mounted to a body-secured or gripped object; and
- a coupling positioned between and coupled to each of the first and second connectors, the coupling adapted for free 360° rotation relative to at least one of the first and second connectors without decoupling therefrom;
- wherein the coupling includes a shaft extending therefrom with a concentrically-threaded hole therein; and
- wherein the second connector includes a leading cylinder adapted to slide over the shaft extending from the coupling.

4. The attachment mechanism of claim 3, wherein a trailing end of the leading cylinder includes an annular shoulder adapted to seat a fastener threaded into the concentrically-threaded hole of the shaft extending from the coupling.

5. The attachment mechanism of claim 4, wherein the annular shoulder and the fastener are adapted to act as a bearing for rotation between the second connector and the coupling.

6. An attachment mechanism wherein comprising:
- a first connector adapted to be mounted to a stable or unstable base;
- a second connector adapted to be mounted to a body-secured or gripped object; and
- a coupling positioned between and coupled to each of the first and second connectors, the coupling adapted for free 360° rotation relative to at least one of the first and second connectors without decoupling therefrom;
- wherein one of the first connector, the second connector, and the coupling includes a female-threaded channel and another of the first connector, the second connector, and the coupling includes a male-threaded shaft adapted for threading into the female-threaded channel;
- wherein the female-threaded channel is threaded at an entrance thereto and is unthreaded distal to the entrance; and
- wherein the male-threaded shaft is threaded at a leading end thereof and is unthreaded distal to the leading end.

7. The attachment mechanism of claim 6, wherein once the male-threaded shaft is completely threaded into the female-threaded channel, the threaded leading end of the male-threaded shaft passes by the threaded entrance of the female-threaded channel such that the another of the first connector, the second connector, and the coupling is capable of free 360° rotation relative to the one of the first connector, the second connector, and the coupling.

8. A method of using an attachment mechanism, the method comprising:
- mounting a coupling to a first connector along a first side of the coupling; and
- mounting the coupling to a second connector along a second side of the coupling opposite the first side thereof,
- wherein the coupling is adapted for free 360° rotation relative to at least one of the first and second connectors without decoupling therefrom;
- wherein mounting the coupling to the second connector includes sliding a leading cylinder of the second connector over a shaft extending from the coupling and threading a fastener into a concentrically-threaded hole of the shaft extending from the coupling.

9. The method of claim 8, wherein a trailing end of the leading cylinder of the second connector includes an annular shoulder adapted to seat the fastener, the annular shoulder and the fastener acting as a bearing for rotation between the second connector and the coupling.

10. A method of using an attachment mechanism, the method comprising:
- mounting a coupling to a first connector along a first side of the coupling; and
- mounting the coupling to a second connector along a second side of the coupling opposite the first side thereof,
- wherein the coupling is adapted for free 360° rotation relative to at least one of the first and second connectors without decoupling therefrom;
- wherein mounting the coupling to the first connector includes threading a male-threaded shaft of the coupling into a female-threaded channel of the first connector;
- the method further comprising completely threading the male-threaded shaft into the female-threaded channel with a threaded leading end of the male-threaded shaft passing by a threaded entrance of the female-threaded channel such that the coupling is capable of free 360° rotation relative to the first connector.

11. The method of claim 10, further comprising dismounting the coupling from the first connector by moving the coupling away from the first connector until the threaded leading end of the male-threaded shaft of the coupling engages the threaded entrance of the female-threaded channel of the first connector and subsequently unscrewing the male-threaded shaft of the coupling from the female-threaded channel of the first connector.

12. An attachment mechanism, comprising:

a first connector adapted to be connected to a fixed or un-fixed base;

a second connector adapted to be connected to a fixed or un-fixed object; and a coupling positioned between and coupled to each of the first and second connectors, the coupling including a first male-threaded shaft and an opposed second shaft extending therefrom with a concentrically-threaded hole therein;

the first connector including a female-threaded channel adapted for threading over the first male-threaded shaft of the coupling, the female-threaded channel being threaded at an entrance thereto and is unthreaded distal to the entrance, and the first male-threaded shaft being threaded at a leading end thereof and is unthreaded distal to the leading end, wherein once the first male-threaded shaft is completely threaded into the female-threaded channel, the threaded leading end of the first male-threaded shaft passes by the threaded entrance of the female-threaded channel such that the coupling is capable of free 360° rotation relative to the first connector; and the second connector including a leading cylinder adapted to be positioned over the second shaft extending from the coupling, a trailing end of the leading cylinder including an annular shoulder adapted to seat a fastener threaded into a concentrically-threaded hole of the second shaft extending from the coupling, and the annular shoulder and the fastener are adapted to act as a bearing for rotation between the second connector and the coupling.

* * * * *